US012090691B2

(12) United States Patent
Lopez Martinez et al.

(10) Patent No.: US 12,090,691 B2
(45) Date of Patent: Sep. 17, 2024

(54) CUTTING AN AIRBAG DOOR HINGE LAYER DURING MOLDING (71) Applicant: Faurecia Interior Systems, Inc., Auburn Hills, MI (US)

(72) Inventors: Carlos Gerardo Lopez Martinez, Puebla (MX); Antonio Esteban Guzman, Puebla (MX); Armando Barrios Zitlalpopoca, Puebla (MX)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/387,941

(22) Filed: Jul. 28, 2021

(65) Prior Publication Data
US 2023/0031059 A1 Feb. 2, 2023

(51) Int. Cl.
*B29C 45/14* (2006.01)
*B29C 45/00* (2006.01)
B29L 31/30 (2006.01)

(52) U.S. Cl.
CPC ...... *B29C 45/0053* (2013.01); *B29C 45/0081* (2013.01); *B29C 45/14336* (2013.01); *B29L 2031/3038* (2013.01)

(58) Field of Classification Search
CPC ............ B29C 45/0053; B29C 45/0081; B29C 45/14336
See application file for complete search history.

(56) References Cited

U.S. PATENT DOCUMENTS

| 5,804,121 A * | 9/1998 | Gallagher | B29C 45/16 264/250 |
| 7,556,284 B2 * | 7/2009 | Riha | D06M 23/16 280/732 |
| 8,240,703 B2 * | 8/2012 | Yeon | B60R 21/215 280/728.3 |
| 10,792,848 B2 | 10/2020 | Alexander | |
| 2003/0020202 A1 * | 1/2003 | Ueno | B60R 21/2165 425/298 |
| 2005/0121818 A1 * | 6/2005 | Cowelchuk | B29C 45/1675 264/258 |
| 2007/0138697 A1 | 6/2007 | Takeda et al. | |
| 2008/0048419 A1 * | 2/2008 | Kong | B60R 21/2165 280/732 |

(Continued)

FOREIGN PATENT DOCUMENTS

| CN | 101130355 | * | 2/2008 |
| CN | 111391777 A | | 7/2020 |

(Continued)

*Primary Examiner* — Edmund H Lee
(74) *Attorney, Agent, or Firm* — Reising Ethington P.C.

(57) ABSTRACT

A method of making a vehicle interior panel having a molded-in airbag door includes cutting a hinge layer of the panel while the hinge layer is supported in a panel molding tool. The hinge layer can be in the form of a reinforcing net and is cut along a perimeter of the airbag door away from the airbag door hinge. The cutting occurs in the molding tool either before or after molding material is introduced into the mold cavity. The cutting also occurs before, during, or after the molding tool is closed from an open condition. A cutter of the molding tool is either stationary or moveable with respect to the portion of the molding tool from which it extends.

20 Claims, 3 Drawing Sheets (56) References Cited

U.S. PATENT DOCUMENTS

| | | | | |
|---|---|---|---|---|
| 2010/0084842 A1* | 4/2010 | Kong | ............... | B60R 21/216 |
| | | | | 280/752 |
| 2012/0091698 A1* | 4/2012 | Wolfe | ............ | B29C 45/0053 |
| | | | | 280/732 |
| 2019/0389103 A1* | 12/2019 | Heikkila | ........ | B29C 45/14786 |

FOREIGN PATENT DOCUMENTS

| | | | |
|---|---|---|---|
| EP | 1884335 A1 | | 2/2008 |
| EP | 1952964 A1 | | 8/2008 |
| FR | 2757794 A1 | | 7/1998 |
| JP | H05253964 A | | 10/1993 |
| JP | 2003048228 | * | 2/2003 |
| JP | 2003094489 | * | 4/2003 |
| JP | 20030326559 | * | 11/2003 |
| JP | 2004082865 | * | 3/2004 |
| JP | 4047521 | * | 2/2008 |
| JP | 2020083016 A | | 6/2020 |
| KR | 100747866 | * | 8/2007 |
| WO | WO2010143213 | * | 12/2010 |

* cited by examiner

CUTTING AN AIRBAG DOOR HINGE LAYER DURING MOLDING

TECHNICAL FIELD

The present disclosure is related generally to vehicle interiors components and, more particularly, to panels positioned over airbags designed to deploy through the panels.

BACKGROUND

Personal automotive vehicles are usually equipped with airbags configured to quickly inflate inside the passenger cabin of the vehicle in the event of a severe vehicle collision. Due to the nature of such collisions, airbags are designed to change from a folded state, hidden behind a vehicle interior panel, to a fully inflated stated in less than one-tenth of a second. During that short time period, the airbag must also typically break through the overlying interior panel, which is typically an upholstered plastic panel. Such panels are carefully engineered to break in a controlled manner so that the airbag is impeded as little as possible and so that the overlying panel does not break into multiple pieces during deployment.

Japanese patent publication JPH 052553964A discloses a method of making a steering wheel panel for placement over an airbag. The panel is made by placing a reinforcing net horizontally in a foam molding tool. The net has pre-formed slits that fit over vertical pins extending from the bottom part of the molding tool. With the net in place on the pins, the pins are retracted toward the bottom part of the tool, and the net is locally pinched between heads of the pins and the bottom part of the tool. Foam material is injected into the tool over the net. The pins hold the net in place during molding and prevent the edges of the slit from rising toward the show surface of the finished panel, which was a problem in the prior art. The net extends over the entire tear seam region of the panel. While this arrangement may prevent the panel from fracturing into multiple pieces during airbag deployment, it also counterproductively reinforces the tear seam of the panel.

SUMMARY

In accordance with various embodiments, a method of making a vehicle interior panel having a molded-in airbag door includes cutting a hinge layer of the panel while the hinge layer is supported between first and second portions of a molding tool in which the panel is molded.

In various embodiments, the step of cutting is performed while the molding tool is changing from an open condition to a closed condition before the panel is molded.

In various embodiments, the step of cutting is performed while the molding tool is in a closed condition.

In various embodiments, the step of cutting is performed after the panel is molded.

In various embodiments, the molding tool includes a cutter extending from and being stationary with respect to one of said portions of the molding tool.

In various embodiments, the molding tool includes a cutter moveably coupled with one of said portions of the molding tool, the cutter being configured to move with respect to the portion with which it is coupled via an actuator.

In various embodiments, the molding tool comprises an ejector coupled with one of the portions of the molding tool. The ejector is biased toward a cutter during the step of cutting.

In various embodiments, the method includes: supporting the hinge layer between the first and second portions of the molding tool with the molding tool in an open condition; moving the first portion relative to the second portion to change the molding tool to a closed condition to thereby form a mold cavity between the first and second portions of the molding tool with at least a portion of the hinge layer located in the mold cavity; and introducing molding material into the mold cavity so that the hinge layer is at least partially embedded in the molding material. The step of cutting is performed during the step of moving.

In various embodiments, the method includes: supporting the hinge layer between the first and second portions of the molding tool with the molding tool in an open condition; moving the first portion relative to the second portion to change the molding tool to a closed condition to thereby form a mold cavity between the first and second portions of the molding tool with at least a portion of the hinge layer located in the mold cavity; and introducing molding material into the mold cavity so that the hinge layer is at least partially embedded in the molding material. The step of cutting is performed after the step of introducing.

In various embodiments, the method includes: storing a waste portion of the hinge layer formed during the step of cutting in a secondary cavity of the molding tool; and ejecting the waste portion from the molding tool after the panel is molded.

In various embodiments, the airbag door has a perimeter including a hinge portion and an edge portion, and the hinge layer is cut along the edge portion during the step of cutting.

In various embodiments, the hinge layer is cut along a side of the airbag door perimeter opposite the hinge portion of the perimeter during the step of cutting.

In various embodiments, the edge portion has a U-shape and the hinge layer is cut along opposite sides of the U-shape during the step of cutting.

In various embodiments, the airbag door is a first airbag door having a first perimeter and the panel includes a second molded-in airbag door having a second perimeter. The hinge layer is cut between the first and second perimeters during the step of cutting.

In various embodiments, the hinge layer is a reinforcing net.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel having a molded-in airbag door, along with a method of making the panel with a molding tool equipped to cut part of the panel while in the molding tool. The method eliminates post-molding processes and, thereby, the need for additional equipment, manufacturing floor space, and fixturing—which can be quite large when the molded panel is an instrument panel, for example.

Figure 1:
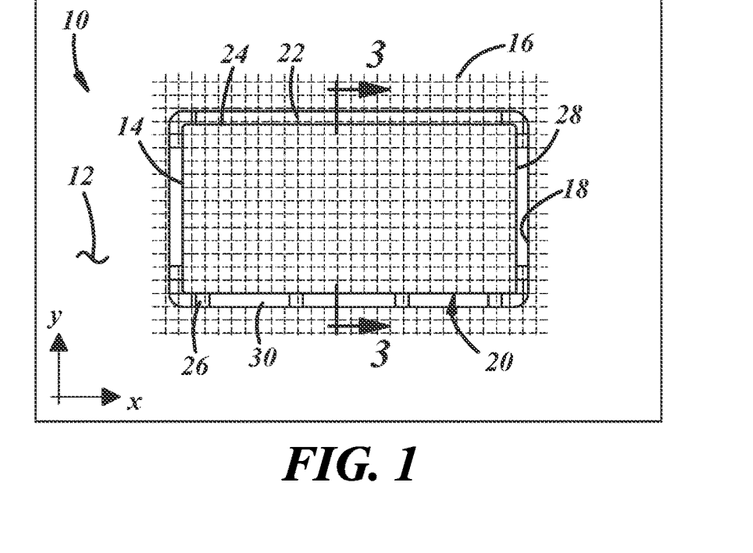
FIG. 1 is plan view of a portion of a vehicle interior panel with a molded-in airbag door and an embedded hinge layer.

FIG. 1 is a plan view of a portion of a vehicle interior panel 10, such as an instrument panel made for installation along a front end of a vehicle passenger cabin and spanning at least a portion (e.g., 40-100%) of the transverse width of the cabin. When installed in the vehicle, the panel 10 overlies an airbag module configured to inflate an airbag in the event of a vehicle collision. The panel 10 is illustrated untrimmed to show certain features but will typically have a decorative trim layer (e.g., a foam-backed TPU layer or spacer fabric-backed leather) covering at least the illustrated portion of the panel when installed in the vehicle.

The panel 10 has a frame 12, an airbag door 14, and an embedded hinge layer 16. The panel 10 is molded from a polymer-based material such as a fiber-reinforced polyolefin, a polycarbonate alloy (e.g., PC/ABS), or a thermoplastic elastomer (TPE). The airbag door 14 is a molded-in feature of the panel 10, meaning that the airbag door is formed together with the surrounding frame 12 in the same mold cavity and from the same material as one continuous piece. The airbag door 14 is located entirely within an inner perimeter 18 of the frame 12. This perimeter 18 at least partly defines a deployment opening through which the underlying airbag deploys into the passenger cabin. In the case of an instrument panel, the frame 12 is embodied as the portion of the molded panel 10 outside of and surrounding the airbag door 14. These teachings are also applicable to interior panels in the form of a drop-in or backside airbag chute assembly having a frame configured for attachment to an instrument panel at a deployment opening formed through the panel. Door panels, roof panels, steering wheel panels, and seat panels are some other non-limiting examples of applicable interior panels.

The airbag door 14 has an outer perimeter 20 lying within the inner perimeter 18 of the frame 12 and may have an outer surface generally in the same plane or along the same contour as the surrounding portion of the frame. The airbag door 14 may include other features such as a network of stiffening ribs along one or both of the illustrated outer surface and the opposite inner surface. The airbag door 14 is attached to the frame 12 by a hinge 22 along a hinge portion 24 of its perimeter 20 and one or more material bridges 26 along an edge portion 28 of its perimeter. In this example, the hinge portion 24 is along one of the long sides of the rectangular perimeter 20, and the edge portion 28 is the remaining U-shaped portion of the perimeter. The hinge 22 and/or the material bridges 26 may also be molded-in features of the panel 10.

Each material bridge 26 extends from the perimeter 20 of the airbag door 14 to the inner perimeter 18 of the frame 12 and locally attaches the door to the frame. Slots or other through-openings 30 are defined along the perimeter 20 of the airbag door 14 between successive material bridges 26. During airbag deployment, the material bridges 26 break due to the localized concentration of stresses from airbag inflation forces so that the airbag door 14 pivots about the hinge 22 to uncover the deployment opening. Each material bridge 26 may have a width in a range from 1 to 4 times a nominal thickness of the panel and a thickness in a range from 0.5 to 1 times the nominal thickness of the panel. Qualitatively, the material bridges 26 need only be strong enough to prevent the airbag door 14 from sagging within the frame 12 and from breaking when subjected to external forces, such as a vehicle occupant unwittingly leaning against the door 14 of the panel 10, which is concealed after the decorative trim layer is added.

Each hinge 22 is configured to stay intact and to maintain attachment of the door 14 to the frame 12 during airbag deployment. This may be accomplished in part by the hinge 22 being continuous along at least most of the hinge portion 24 of the airbag door 14 (as in FIG. 1), by minimizing the number of through-openings along the hinge 22, and/or by providing the hinge in a flexible shape that tends to bend rather than break. The hinge 22 may have a U-shaped cross-section, for example (see FIG. 3).

The hinge layer 16 is provided to maintain attachment of the door 14 to the frame 12 during airbag deployment even if the molded plastic portion of the hinge 22 fractures. The hinge layer 16 is thus a reinforcing layer of the hinge 22 and extends at least across the hinge (in the y-direction of FIG. 1) from a location outside of the inner perimeter 18 of the frame 12 to a location inside the outer perimeter 20 of the airbag door 14. The hinge layer 16 is at least partially embedded in the material of the frame 12, the material of the door 14, and the material of the hinge 22 where present. It is also possible to omit plastic material at the hinge 22 so that the hinge layer 16 is itself the hinge.

In the example of FIG. 1, the hinge layer 16 extends over the entire projected area of the airbag door 14 and outward in a x-y plane, beyond the perimeter 20 of the airbag door and beyond the inner perimeter 18 of the frame. The outermost edges and outer perimeter of the hinge layer 16 are all located and embedded in the frame 12 of the panel 10. While, as a reinforcing layer, the hinge layer 16 is only necessary across the hinge 22, it has been found to be advantageous to extend the hinge layer over the entire area of the airbag door to maximize the amount of surface area of the hinge layer that is in contact with the molded material of the airbag door 14, since the hinge layer 16 may be formed from a different material than the airbag door molding material. Full airbag door coverage ensures that the airbag door 14 does not detach from the hinge layer, such as during airbag deployment.

As a reinforcing layer, the hinge layer 16 may be made from a material stronger than the plastic material in which it is embedded and/or in a stronger form, such as a sheet of fibers. In one example, the hinge layer 16 comprises or is made entirely from aramid fibers. Aramid fibers or an aramid fiber blend may be in the form of a woven fabric sheet, a melt-bonded mesh, or in a unitary extruded net form. As used herein, a net includes any flexible sheet of uniformly arranged stranded material with openings between the strands that are at least as wide as the strands. As an example, strands of aramid fibers having a diameter of 0.5 mm woven together with 0.5 mm or larger spaces between strands constitutes a net. The hinge layer 16 may also be a woven or non-woven fabric layer comprising natural fibers, synthetic fibers, glass fibers, or carbon fibers, to name a few examples. The hinge layer 16 may also be formed from metallic materials, such as a metal wire mesh or metallic fabric, a metal foil, or thin sheet metal. In one embodiment, the hinge layer 16 is a reinforcing net made from a polyester (e.g., PET, PBT). While non-aramid polymers are not as strong as aramids, they may benefit from lower cost and better melt-bonding with the polymer-based material from which the panel is molded.

In FIG. 1, the hinge layer 16 is depicted as a grid-like net with square-shaped openings between strands and is shown in broken lines where it is embedded in the molded material within the perimeter 20 of the airbag door, outside the inner perimeter 18 of the frame 12, along and across the hinge 22, and at the material bridges 26. As described in further detail below, the hinge layer 16 has been cut away at the slots 30 between successive material bridges 26 to sufficiently weaken the hinge layer so that it breaks during airbag deployment along the edge portion 28 of the perimeter 20 of the airbag door 14 but not along the hinge portion 24. In other words, the through-openings 30 extend through both the molded material and the hinge layer 16 between material bridges 26, while the hinge layer is continuous (i.e., with no cut-outs) across the hinge 22 and the material bridges 26. In the example of FIG. 1, the strands of the hinge layer 16 are shown in solid lines near the corners of the airbag door 14, where through-openings are molded between the frame 12 and door 14 but the hinge layer has not been cut away. In other embodiments, the hinge layer 16 is cut away at all through-opening 30 locations.

Figure 2:
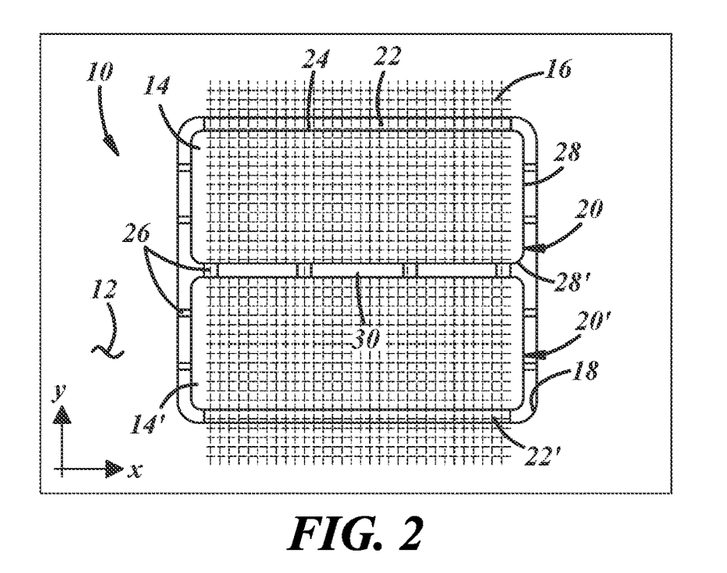
FIG. 2 is plan view of the vehicle interior panel with a second molded-in airbag door.

The example of FIG. 2 includes a second airbag door 14' within the inner perimeter 18 of the frame 12. The discussion of FIG. 2 is limited to the features that are different from those of FIG. 1. The second airbag door 14' is attached to the frame 12 by a second hinge 22' located on the opposite side of the inner perimeter 18 of the frame 12 from the first hinge 22. Material bridges 26 extend between and connect each airbag door 14, 14' to the frame 12 along edge portions 28 of their respective perimeters 20, 20'. Material bridges 26 also extend between and connect the two airbag doors 14, 14' where their edge portions 28, 28' oppose each other and run parallel to each other.

The hinge layer 16 of FIG. 2 extends across both airbag doors 14, 14' and both hinges 22, 22' (in the y-direction) and has a width (in the x-direction) that is the same or less than the length of the hinges 22, 22'. Opposite edges of the outer perimeter of the hinge layer 16 are embedded in the frame 12 outside of the hinge 22. Most of the other two edges of the hinge layer 16 are embedded in the airbag doors 14, 14'. It has been found advantageous to extend the hinge layer 16 over the entire distance of each airbag door 14, 14' between the respective hinge 22, 22' and the opposite edge of the corresponding door. When at least partially embedded in the material of the frame 12, doors 14, 14', and hinges 22, 22', the hinge layer 16 may be initially provided as a single piece extending across both doors and both hinges and then cut at the through-openings 30 while in the molding tool, as discussed further below.

The hinge layer 16 is depicted as a net with square-shaped openings between strands and is shown in broken lines where it is embedded in the molded material, which is everywhere in FIG. 2. The hinge layer 16 has been cut away at the slots 30 between successive material bridges 26 that extend between the two doors 14, 14' to sufficiently weaken the hinge layer so that it breaks during airbag deployment along the respective edge portions of the perimeters 20, 20' of the airbag doors but not along the hinge portions 22, 22'. In other words, the through-openings 30 between the doors 14, 14' extend through both the molded material and the hinge layer 16, while the hinge layer is continuous (i.e., with no cut-outs) across the hinges 22, 22' and the material bridges 26 between the doors 14, 14'. In the example of FIG. 2, the hinge layer 16 was omitted in the molding process at the slots running along the opposite side edges of the airbag doors 14, 14'.

Figure 3:
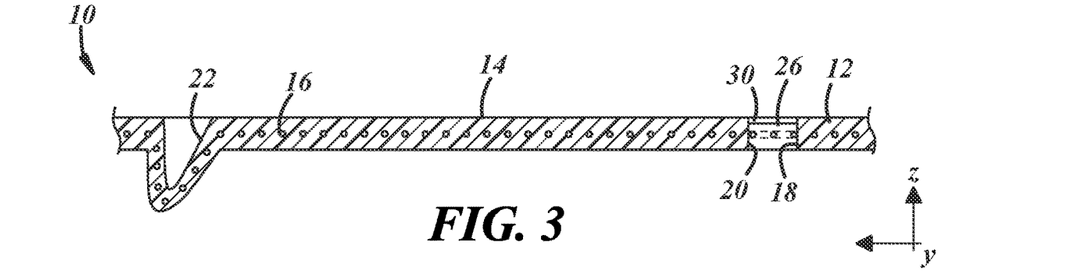
FIG. 3 is a cross-sectional view of the panel of FIG. 1.

FIG. 3 is a cross-sectional view of the panel 10 of FIG. 1, illustrating the airbag door 14 within the perimeter 18 of the frame 12 and attached to the frame by the hinge 22 and material bridges 26. The hinge layer 16 is depicted as small circles in FIG. 3, extending from a portion of the frame 12 adjacent the hinge 22, across the hinge, across the material bridges 26, and into a portion of the frame opposite the hinge side of the door 14. The cross-sectional view is taken through one of the slots 30 between material bridges 26 of FIG. 1 so that one of the material bridges 26 is visible. Here, the hinge layer 16 is depicted as visible along the material bridge 26 because the hinge layer has been cut while in the molding tool in which the panel 10 was molded. While the hinge layer 16 of FIG. 3 is illustrated as fully embedded within the thickness of the molded portions of the frame 12, door 14, and hinge 22, this is not always the case. For example, the hinge layer 16 may be closer to one side (e.g., the bottom side) of the airbag door 14 than the other due to the material flow direction and initial molding pressures during panel 10 molding, and a portion of the hinge layer may show through at that side of the door. Also, when stiffening ribs are molded into the airbag door 14, the hinge layer 16 may be fully embedded only at the stiffening ribs, but not at the surface of the door 14 from which the ribs extend.

Described below are embodiments of an exemplary method of making the above-described panel 10 for use over a deployable airbag. The method includes cutting the hinge layer 16 while it is supported in or by the molding tool in which the panel 10 is molded. FIGS. 4-7 are side cross-sectional views of part of such a molding tool 100 illustrated at various stages of the method. The molding tool 100 includes a first portion 102 and a second portion 104 that are moveable relative to each other between an open position (FIG. 4) and a closed position (FIG. 6) in which a mold cavity 106 is formed between the two tool portions. In this example, the first portion 102 of the tool 100 is stationary and includes injection nozzles 108 that open on the surface of the first portion 102, while the second portion 104 moves horizontally toward and away from the first portion 102 to respectively close and open the molding tool. The cross-sectional view of FIGS. 4-7 is taken through a portion of the molding tool along which the hinge layer 16 is to be cut and where a slot 30 is to be formed through the panel 10.

Figure 4:
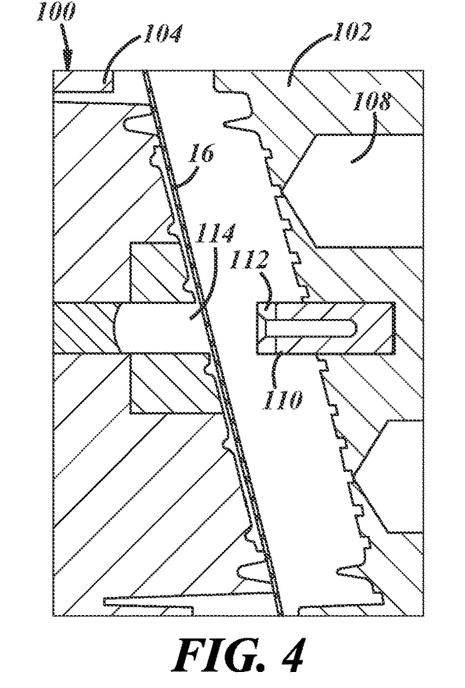
FIG. 4 is a cross-sectional view of a panel molding tool in an open condition.

FIG. 4 illustrates the molding tool 100 in the open condition and with the hinge layer 16 supported between the first and second tool portions 102, 104. The hinge layer 16 is supported by the second portion of 104 of the tool 100 in this example. In one embodiment, locating pins (not shown) extend from the second portion 104 of the tool 100 and locator holes on the sheet of hinge layer material are placed over the locating pins to hold it in place between the tool portions 102, 104 before the tool is closed. The first tool portion 102 may have corresponding recesses to accommodate the locating pins when the tool is closed. Other means of support are possible, such as a vacuum provided along a mold surface or a continuous roll of hinge layer material being fed between the tool portions 102, 104 and indexed between molding cycles.

The molding tool 100 includes a cutter 110 configured to cut the hinge layer 16 while the hinge layer is supported between the tool portions 102, 104. In this example, the cutter 110 extends from and is stationary with respect to the first tool portion 102. The illustrated cutter 110 has a removable and replaceable portion 112 at its cutting end to allow the use of exceptionally hard materials (e.g., tungsten carbide) without the need to make the entire length of the cutter from such a hard material. The second portion 104 of the tool 100 includes a receiving opening 114 to accommodate the cutting end of the cutter 110. The opening 114 may be formed as part of an insert for replacement after long periods of use with the cutter 110. In another embodiment, the cutter 110 is a one-piece replaceable insert made from a hardened tool steel for ease of cutter fabrication.

Figure 5:
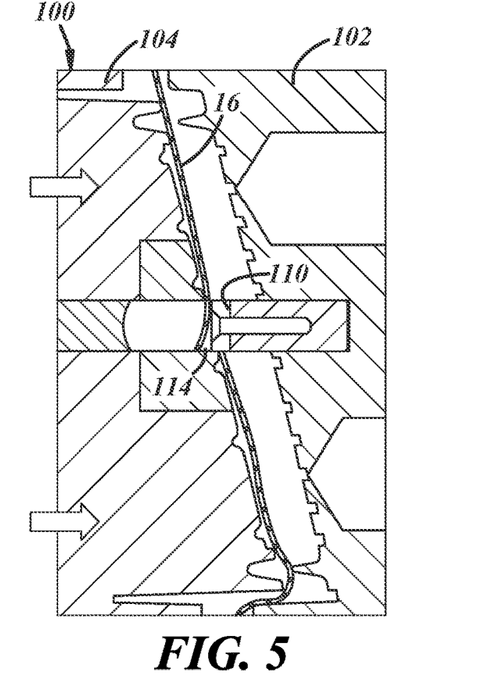
FIG. 5 is a cross-sectional view of the tool of FIG. 4 moving toward a closed condition.

In the illustrated example, the hinge layer 16 is cut during a mold closing step and before any molding material is introduced to the mold cavity 106, as follows. After the hinge layer 16 is supported between the tool portions 102, 104 in the open condition, the tool portions are brought toward each other, in this case by the second tool portion 104 moving toward the first 102. As this relative movement continues to bring the tool 100 toward its closed condition, the cutter 110 shears through the hinge layer 16 at the interface between the cutter and the receiving opening 114. This is illustrated in FIG. 5, where the portion of the hinge layer 16 along the bottom of the cutter 110 has been cut.

Figure 6:
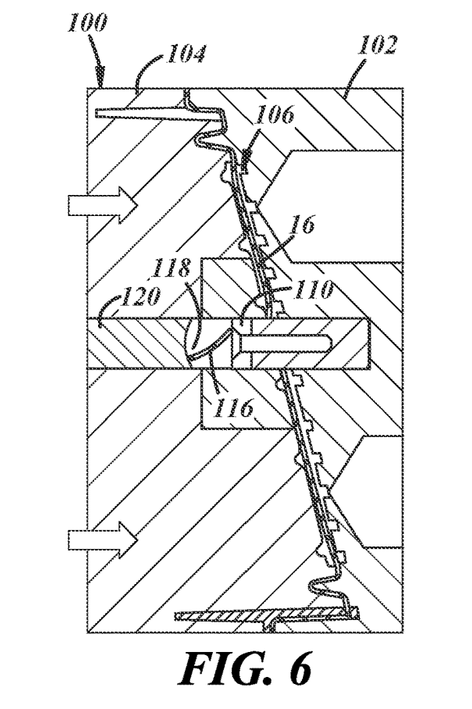
FIG. 6 is a cross-sectional view of the tool of FIGS. 4 and 5 in the closed condition.

The mold closing step continues until the tool 100 is in the closed condition of FIG. 6, in which the mold cavity 106 is fully defined. By this stage, the cutter 110 has cut through the entire thickness of the hinge layer 16 and a waste portion 116 of the hinge layer is produced and located in a secondary cavity 118 defined in the receiving opening 114 between the cutting end of the cutter 110 and an ejector 120 of the second tool portion 104. The waste portion 116 is stored in this secondary cavity 118 for the remainder of the molding process. With the tool 100 in the closed condition of FIG. 6, the hinge layer 16 is clamped between the tool portions 102, 104 at some locations in the mold cavity 106—in this case at the locations of the hinges 22, 22'—and at least a portion of the hinge layer is located in the unfilled cavity 106.

Figure 7:
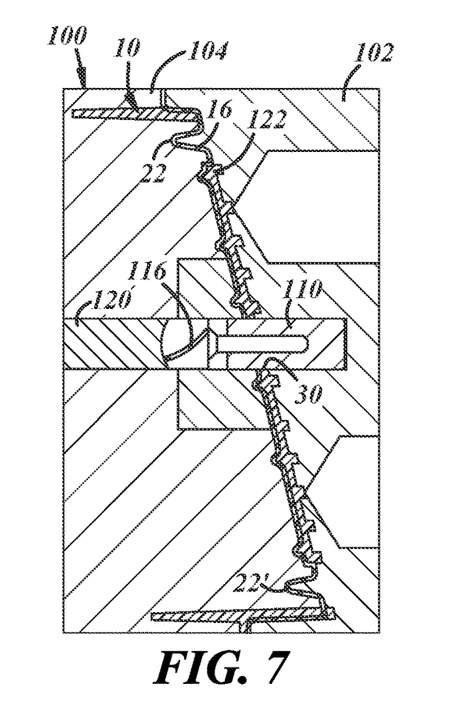
FIG. 7 is the cross-sectional view of FIG. 6 after molding material is introduced into the mold cavity.

Molding material 122 is then introduced into the mold cavity 106 so that the hinge layer 16 is at least partially embedded in the molding material, as shown in FIG. 7. Here, the cutter 110 forms a portion of the surface of the mold cavity 106. In particular, slots 30 such as those between the airbag doors of FIG. 2 are formed around the cutter 110. The introduction of the molding material 122 may be via thermoplastic injection molding or any other suitable process (e.g., transfer molding, RIM, etc.). Once the material 122 has sufficiently solidified, the tool 100 can be returned to the open condition and the molded panel 10 can be removed from the tool. The ejector 120 may be configured to move together with other ejector pins (i.e., toward the first portion 102 of the tool) that push the molded part 10 off of the second portion 104 of the tool to eject the waste portion 116 of the hinge layer from the tool 100.

In a variation of the process of FIGS. 4-7, the hinge layer 16 is cut after the molding tool is in the closed condition but before the molding material is introduced into the mold cavity. The cutter 110 may for example be coupled with the first tool portion 102 so that it is moveable with respect to the first tool portion under the power of an actuator (e.g., a fluid-powered cylinder). In that case, the cutter 110 may be in a retracted position in the first portion 102 of the tool when the tool is transitioning from the open to the closed condition, and then extended to perform the cutting step after the mold is closed. The cutter can then be retracted again after the molded part is solidified and/or after the tool reaches the open condition.

Figures 8, 9:
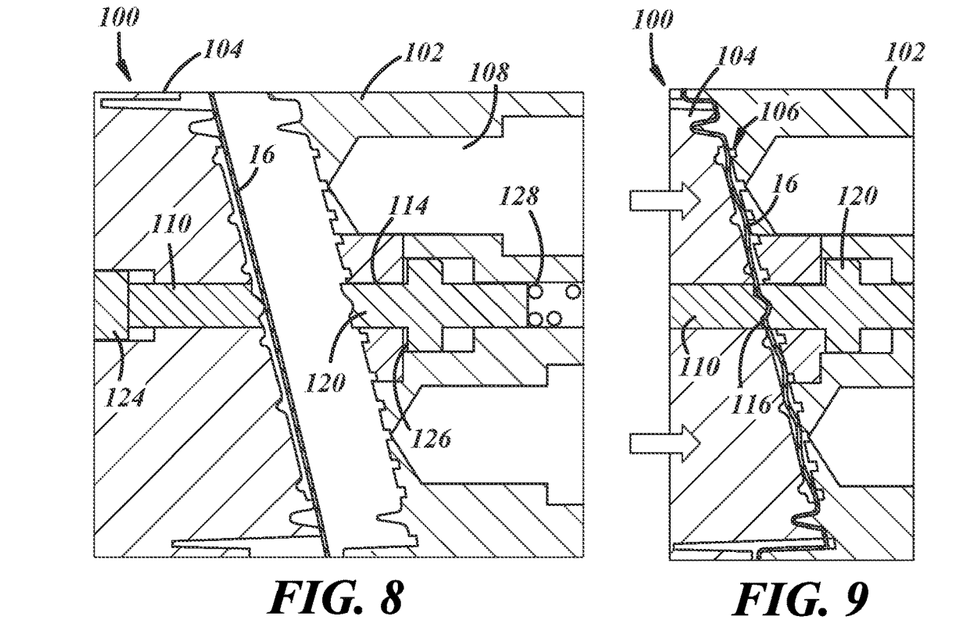
FIG. 8 is a cross-sectional view of a panel molding tool in the open condition.
FIG. 9 is a cross-sectional view of the tool of FIG. 8 in the closed condition.

FIGS. 8-11 illustrates another embodiment of the method in which the hinge layer 16 is cut after the tool 100 is in the closed condition and after the molding material has been introduced into the mold cavity. FIG. 8 illustrates the molding tool 100 in the open condition and with the hinge layer 16 supported between the first and second tool portions 102, 104 in a similar manner to that of FIG. 4. In this example, the cutter 110 is moveably coupled with the second portion 104 of the molding tool 100 and is configured to move with respect to the second portion 104 of the molding tool via an actuator 124, such as a hydraulic or other fluid-powered cylinder. The illustrated cutter 110 is one piece but could include a replaceable carbide cutting end as in the previous example.

The first portion 104 of the tool 100 includes a receiving opening 114 to accommodate the cutting end of the cutter 110 when actuated. The opening 114 may be formed as part of an insert for replacement after long periods of use with the cutter 110. In this example, the ejector 120 is movably coupled with the first portion 102 of the tool 100. A shoulder 126 of the ejector 120 is biased toward the second tool portion 104 and against a back side of the receiving opening insert by a die spring 128. An ejection end of the ejector 120 faces the second tool portion 104 and is located within the receiving opening 114.

After the hinge layer 16 is supported between the tool portions 102, 104 in the open condition, the tool portions are brought toward each other, in this case by the second tool portion 104 moving toward the first 102, to bring the tool 100 to the closed condition of FIG. 9, in which the mold cavity 106 is fully defined. At this stage, the cutter 110 is resting against the hinge layer 16 but has not yet cut it, and the intended waste portion 116 of the hinge layer is clamped between the cutter 110 and the ejector 120. Other portions of the hinge layer 16 are located in the unfilled cavity 106.

Figure 10:
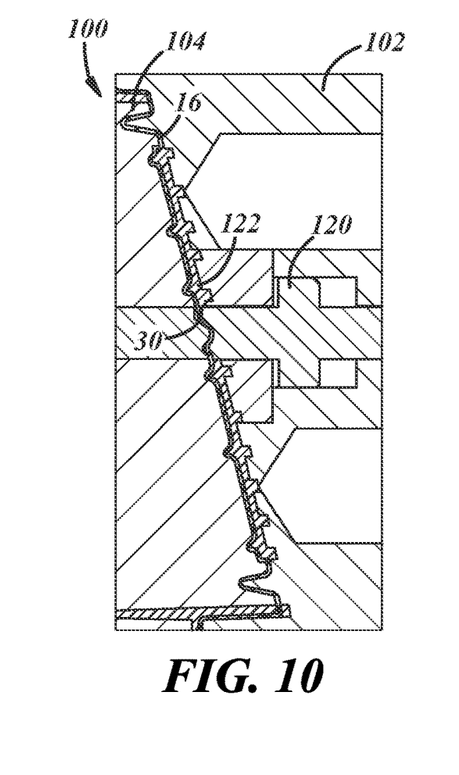
FIG. 10 is the cross-sectional view of FIG. 9 after molding material is introduced into the mold cavity.
Figure 11:
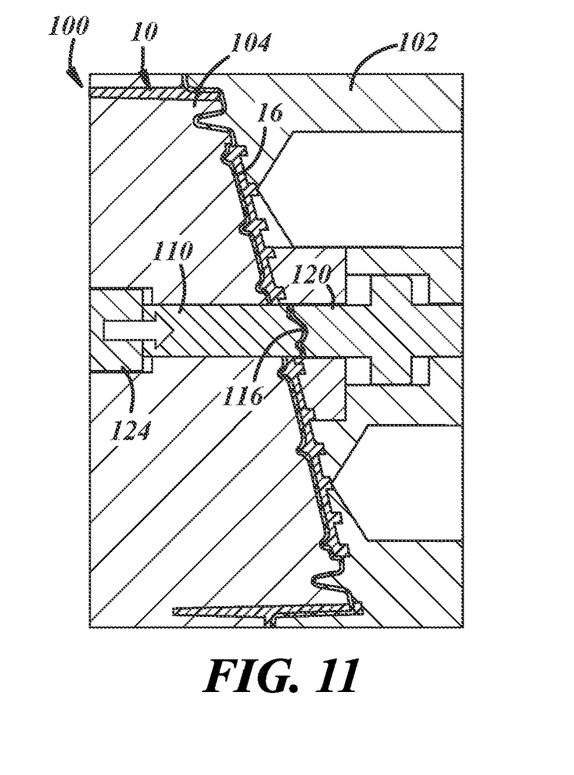
FIG. 11 is a cross-sectional view of FIG. 10 during cutting of the hinge layer.

Molding material 122 is then introduced into the mold cavity 106 so that the hinge layer 16 is at least partially embedded in the molding material, as shown in FIG. 10. Here, the ejector 120 forms a portion of the surface of the mold cavity 106. In particular, a slot 30 such as those between the airbag doors of FIG. 2 are formed around the end of the ejector 120. The introduction of the molding material 122 may be the same as described above.

Once the molding material 122 has sufficiently solidified, the cutter 110 is moved toward the opposite tool portion 102 via the actuator 124 to cut through the hinge layer 16. During this cutting stroke, the end of the ejector 120 is biased toward the cutter 110 with the waste portion 116 of the hinge layer trapped therebetween. When the cutter 110 and ejector 120 are moved away from each other again, either by the actuator 124 or by opening the molding tool 100, the die spring bias returns the ejector to its home position of FIGS. 8-10. After the hinge layer 16 is cut, the tool 100 can be returned to the open condition and the molded panel 10 can be removed from the tool, along with the waste portion 116 of the hinge layer 16.

It should be noted that the "first" and "second" designations in the above description and in the accompanying claims are arbitrary, having no particular significance other than to distinguish one feature from another similar feature for purposes of description. For instance, the "first" and "second" designations used in the description of FIGS. 8-11 to distinguish the distinct tool portions could be switched with no effect on the description. As such, these terms, when used in the claims, shall not be limited to the particular features associated with the same "first" and "second" designations in the description.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel having a molded-in airbag door, the panel comprising a hinge layer at least partially embedded in a molding material with a through-opening defined through the molding material along a perimeter of the airbag door, the method comprising the steps of:
   supporting the hinge layer between first and second portions of a molding tool with the molding tool in an open condition;
   moving the first portion relative to the second portion to change the molding tool to a closed condition to thereby form an unfilled mold cavity between said portions of the molding tool with at least a portion of the hinge layer located in the mold cavity;
   introducing the molding material into the mold cavity when the molding tool is in the closed condition so that the hinge layer is at least partially embedded in the molding material; and
   forming a cut through the hinge layer while the hinge layer is supported between the first and second portions of the molding tool into which the molding material is introduced,
   wherein the cut through the hinge layer is at the through-opening defined through the molding material along the perimeter of the airbag door such that at least a portion of the cut is free from the molding material.

2. The method of claim 1, wherein the step of forming the cut is performed while the molding tool is changing from the open condition to the closed condition before the step of introducing the molding material.

3. The method of claim 1, wherein the step of forming the cut is performed while the molding tool is in the closed condition.

4. The method of claim 3, wherein the step of forming the cut is performed after the panel is molded.

5. The method of claim 1, wherein the molding tool comprises a cutter extending from and being stationary with respect to one of said portions of the molding tool.

6. The method of claim 1, wherein the molding tool comprises a cutter moveably coupled with one of said portions of the molding tool, the cutter being configured to move with respect to the portion with which it is coupled via an actuator.

7. The method of claim 6, wherein the molding tool comprises an ejector coupled with the other of said portions of the molding tool, the ejector being biased toward the cutter during the step of forming the cut.

8. The method of claim 1, further comprising:
   storing a waste portion of the hinge layer formed during the step of forming the cut in a secondary cavity of the molding tool; and
   ejecting the waste portion from the molding tool after the panel is molded.

9. The method of claim 1, wherein the perimeter of the airbag door has a hinge portion and an edge portion, and wherein the hinge layer is cut along the edge portion during the step of forming the cut.

10. The method of claim 9, wherein the hinge layer is cut along a side of the airbag door perimeter opposite the hinge portion of the perimeter during the step of forming the cut.

11. The method of claim 9, wherein the edge portion has a U-shape and the hinge layer is cut along opposite sides of the U-shape during the step of forming the cut.

12. The method of claim 1, wherein the airbag door is a first airbag door, the perimeter is a first perimeter, and the panel includes a second molded-in airbag door having a second perimeter, the hinge layer being cut between the first and second perimeters during the step of forming the cut.

13. The method of claim 1, wherein the hinge layer is a reinforcing net.

14. The method of claim 1, wherein a waste portion of the hinge layer formed during the step of forming the cut remains in the molding tool until the molded panel is removed from the molding tool.

15. The method of claim 1, further comprising the step of changing the molding tool from the closed condition to an open condition after the step of forming the cut, wherein a waste portion of the hinge layer formed during the step of forming the cut is ejected from the tool when the molding tool is in the open condition.

16. The method of claim 1, wherein the molding tool includes a cutter used in the step of forming the cut, and the through-opening is formed around the cutter.

17. The method of claim 1, wherein the molding tool includes an ejector, and the through-opening is formed around the ejector.

18. The method of claim 1, wherein the airbag door is formed together with a surrounding frame of the panel in the same mold cavity and from the same material as one continuous piece.

19. The method of claim 1, wherein the molding tool is an injection molding tool and the step of introducing the molding material includes thermoplastic injection molding, and wherein the step of forming the cut is performed while the hinge layer is supported between the first and second portions of the injection molding tool.

20. A method of making a vehicle interior panel having a molded-in airbag door, the panel comprising a hinge layer at least partially embedded in a molding material with a through-opening defined through the molding material along a perimeter of the airbag door, the method comprising the step of forming a cut through the hinge layer while the hinge layer is supported between first and second portions of an injection molding tool in which the panel is molded, wherein the cut through the hinge layer is at the through-opening defined through the molding material along the perimeter of the airbag door such that at least a portion of the cut is free from the molding material.

\* \* \* \* \*